US006286474B1

(12) United States Patent
Downs et al.

(10) Patent No.: US 6,286,474 B1
(45) Date of Patent: Sep. 11, 2001

(54) ENGINE BALANCER

(75) Inventors: Robert Charles Downs, La Jolla, CA (US); Arvo J. Siismets, Troy, MI (US)

(73) Assignee: Saturn Corporation, Troy, MI (US)

( * ) Notice: Subject to any disclaimer, the term of this patent is extended or adjusted under 35 U.S.C. 154(b) by 0 days.

(21) Appl. No.: 09/481,855

(22) Filed: Jan. 12, 2000

(51) Int. Cl.[7] .................................................. F02B 75/06
(52) U.S. Cl. .......................................................... 123/192.2
(58) Field of Search ............................ 74/603; 123/192.2

(56) References Cited

U.S. PATENT DOCUMENTS

| 4,300,493 | * | 11/1981 | Berti | 123/192.2 |
| 5,305,656 | * | 4/1994 | Kamiya et al. | 123/192.2 |
| 5,535,643 | | 7/1996 | Garza | 74/603 |
| 5,657,728 | * | 8/1997 | Diggs | 123/192.2 |
| 5,875,753 | * | 3/1999 | Ishikawa | 123/192.2 |

* cited by examiner

Primary Examiner—Tony M. Argenbright
Assistant Examiner—Hyder Ali
(74) Attorney, Agent, or Firm—Laura C. Hargitt

(57) ABSTRACT

An internal combustion engine comprises a crankshaft having a helical spur gear mounted for rotation therewith and a balancer. The balancer includes a balancer housing and first and second balance shafts rotatably carried in the balancer housing about laterally spaced parallel axes. A first gear is mounted on the first balance shaft and driven by the helical spur gear at a speed determined by the crankshaft. A second gear is mounted on the second balance shaft for meshing engagement with the first gear for rotation in a direction opposite to the first gear. The helical spur gear and the first and second gears have teeth yielding an involute contact ratio of approximately 3 and a total contact ratio of approximately 5 to thereby reduce gear rattle. One of the balancer gears is aluminum and the other balancer gear is grey cast iron.

7 Claims, 4 Drawing Sheets

ENGINE BALANCER

TECHNICAL FIELD

This invention relates to an engine balancer having two weighted balance shafts for an internal combustion engine.

BACKGROUND OF THE INVENTION

Certain engine configurations, in particular in-line four cylinder engines, are known to generate second order vibration unbalance. To offset this unbalance, a balancer including a pair of balance shafts is integrated into the engine. The balance shafts are carried in a housing below the crankshaft and rotate in opposite directions at twice the crankshaft speed. A crankshaft gear or chain drives the first balance shaft, which in turn drives the second balance shaft through a pair of drive and timing gears.

A common concern of balancers is gear rattle noise, accentuated at engine idle when the crankshaft rotational velocity fluctuates between firing pulses of succeeding cylinders. The velocity fluctuation causes the meshing teeth of the balance shaft drive and timing gears to lose contact and impact adjacent teeth.

Gear rattle may be reduced by including drag-inducing elements to increase the drag torque on the second balance shaft, thereby reducing the speed differential between the first and second balance shafts. Drag-inducing elements, such as oil pumps, driving chains, and journal bearings, may reduce rattle but at the expense of fuel economy and system efficiency.

In addition, balance shaft gears generally only have a pair of teeth in contact at a given time so these contacting teeth must be able to withstand the impact of the one upon the other. Therefore the gears are usually steel that may be carburized, quenched, and tempered after the final machining of the teeth to provide sufficient strength. Such heat treatment has the potential for distorting the dimensions of the teeth.

SUMMARY OF THE INVENTION

The present invention provides a solution to the noise concern of balancer gear rattle at idle, in addition to several other potential benefits. The balancer drive system is gear-driven with an engine crankshaft helical spur gear driving a first balance shaft gear, which in turn drives a second balance shaft gear in a counter-rotating manner. The gear teeth are designed with sufficiently fine gear pitch, shallow pressure angle, and a high helix angle to yield an involute contact ratio of approximately three and a total contact ratio of approximately five. Therefore about five teeth are meshed at a given time, providing greater load sharing and less noise transmission.

In a preferred embodiment, the crankshaft helical spur gear is made from grey cast iron and drives the first balance shaft gear made from aluminum. The aluminum first balance shaft gear drives a grey cast iron, second balance shaft gear. The mixed material selection provides two key advantages. First, grey cast iron is more likely to have microscopic graphite flakes that provide damping properties to the gears thereby reducing noise vibrations. Second, modern engine blocks and balance shaft housings tend to be made from aluminum for mass efficiency. Aluminum thermally expands at a faster rate than ferrous based materials. If all the gears were made from ferrous material, the backlash between gears, and therefore gear rattle, would increase as the engine temperature increased. Including an aluminum gear provides partial thermal compensation to reduce backlash. The system is designed to take advantage of the benefits from both materials.

Due to the novel gear design and material selection, the balancer drive system may be all gear-driven with no drag-inducing chains. Also roller bearings for the balance shafts, which only require splash lubrication, may be employed instead of journal bearings, which require pressure lubrication.

DESCRIPTION OF THE PREFERRED EMBODIMENT

Figure 1:
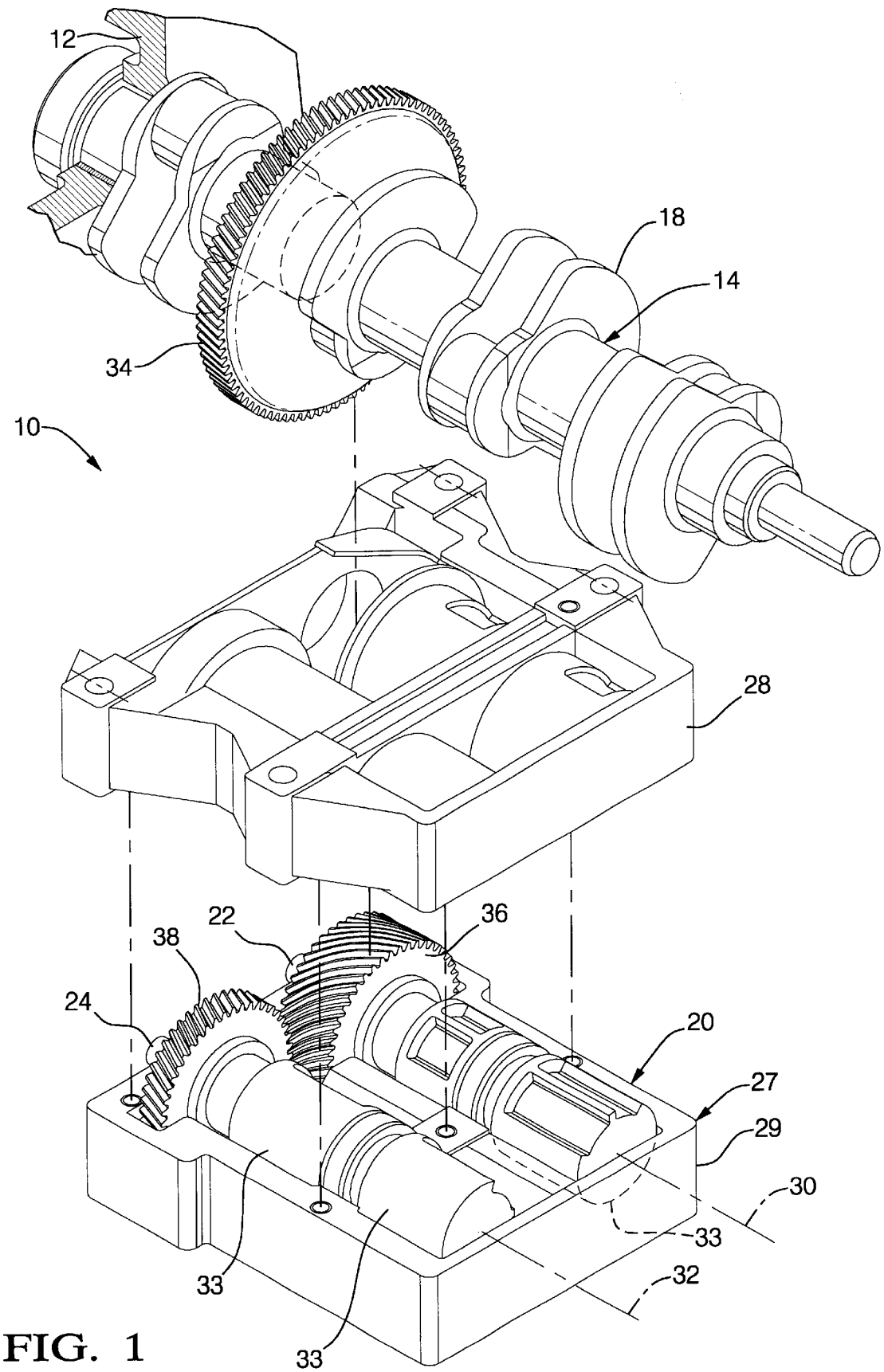
FIG. 1 is an expanded pictorial view of a crankshaft and a balancer, embodying features of the present invention.
Figure 2:
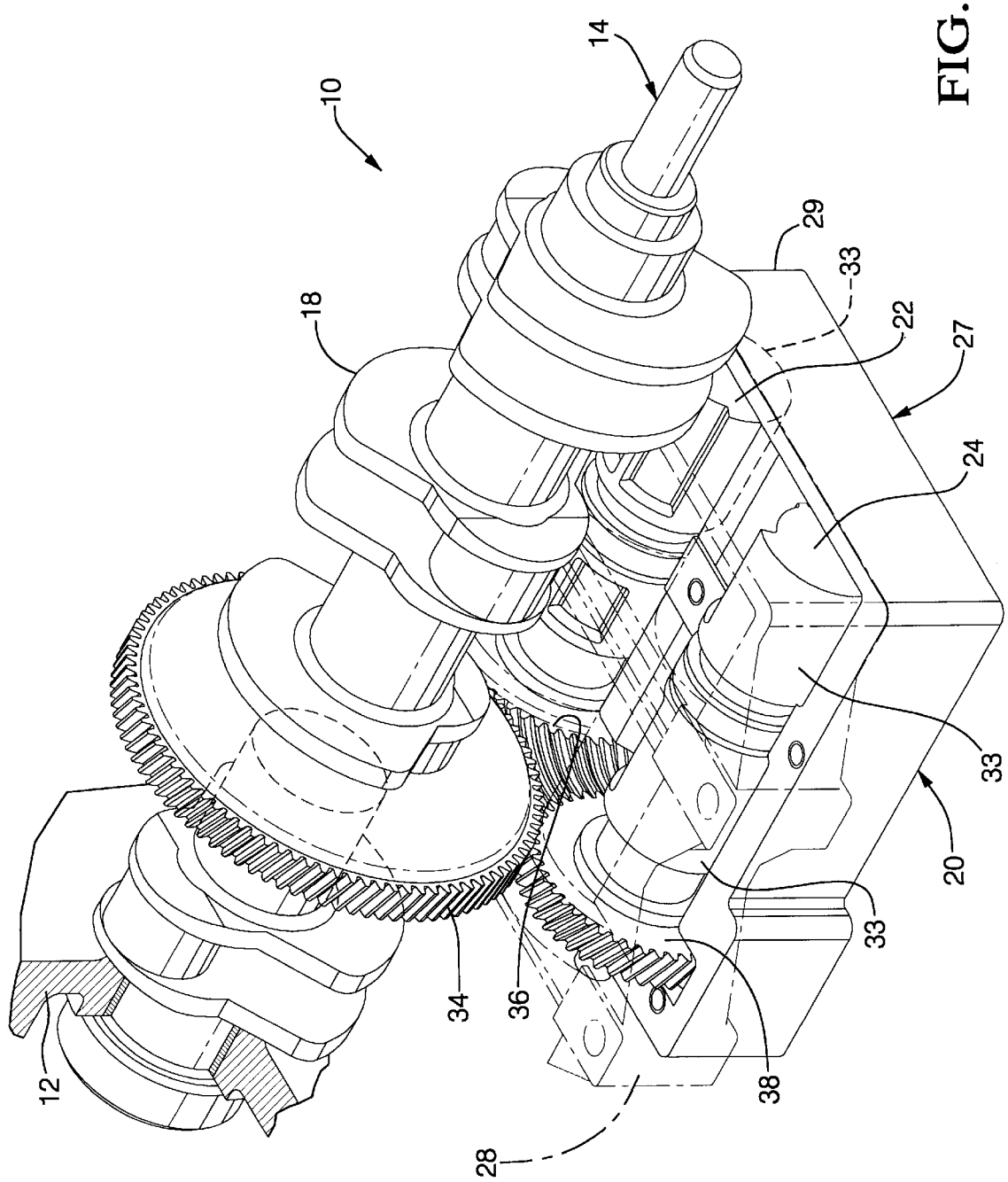
FIG. 2 is an isometric view of the crankshaft and balancer assembled.

FIGS. 1 and 2 illustrate the environment of an internal combustion engine such as an in-line four cylinder, shown generally as 10, having a cylinder block 12 including cylinders and pistons, not shown. A crankshaft 14 is rotatably carried in a crankcase portion of the block 12. Connecting rods 16, FIG. 4, connect throws 18 of the crankshaft 14 with the pistons, reciprocation of which create a second order vibration unbalance in the form of a vertical shaking force cycling at twice the crankshaft speed.

Figure 4:
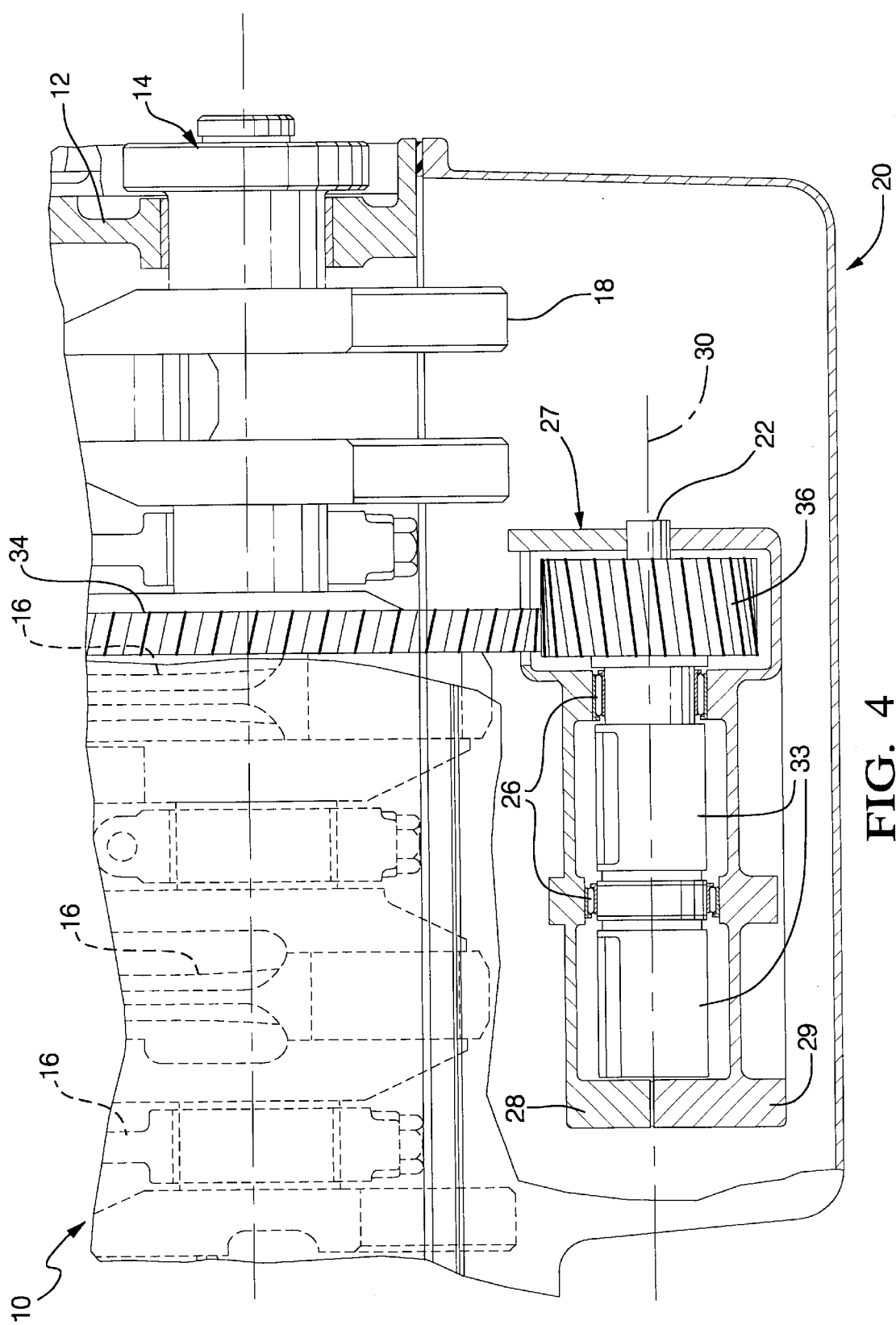
FIG. 4 is a lengthwise cross sectional side view of the crankshaft and balancer.

To balance this secondary vibration, the engine 10 is provided with a balancer 20 including first and second balance shafts, 22 and 24 respectively, rotatably supported by roller bearings 26, FIG. 4, in a balancer housing 27. The balancer housing 27 is split horizontally into upper and lower portions, 28 and 29 respectively. The upper and lower portions 28,29 are bolted together and secured to the crankcase portion of the engine block 12. The roller bearings 26 provide minimal frictional drag and only require mist lubrication as opposed to pressure lubrication which draws on system oil pressure.

The balance shafts 22,24 rotate in opposing directions about first and second laterally spaced parallel axes 30 and 32 respectively. Each balance shaft 22,24 includes offset portions 33 which comprise equivalent counterweights that spin freely. The shaking force developed by the weights 33 should be approximately equal and opposite to that of the engine secondary unbalance force.

The balancer 20 is driven by a crankshaft means such as a crankshaft helical spur gear 34 mounted for rotation with the crankshaft 14. The crankshaft helical spur gear 34 meshes with a first gear 36 mounted on the first balance shaft 22 to rotate the first gear and balance shaft at twice the crankshaft speed. The first gear 36 of the first balance shaft 22 transfers a counter-rotating force to a second gear 38 mounted on the second balance shaft 24. The counter-rotating balance shafts 22,24 operate to balance secondary vibration in the engine.

Figure 3:
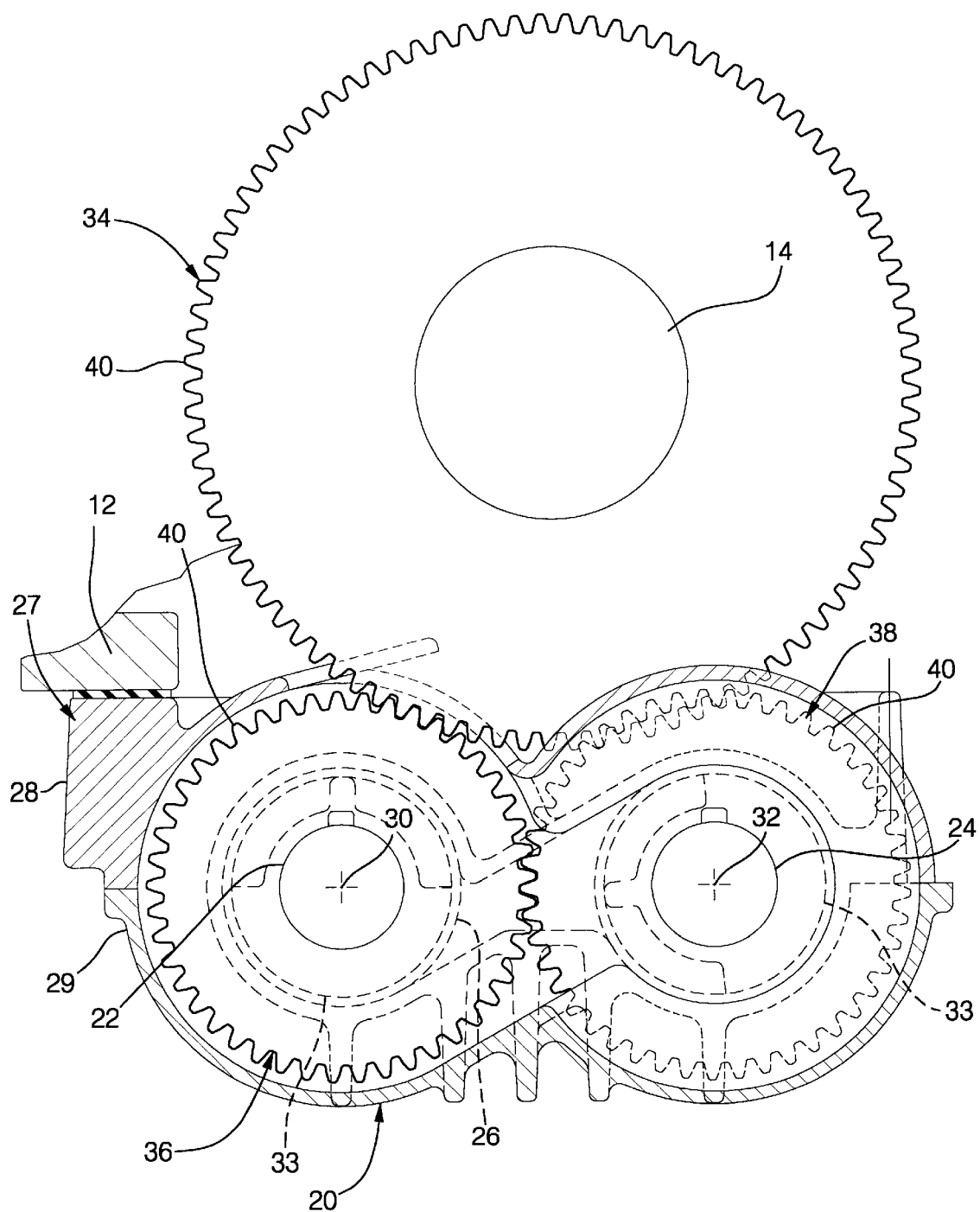
FIG. 3 is an end view of the gear interaction between the crankshaft and balancer.

To reduce gear rattle, the teeth 40 of the three meshing gears 34,36,38, FIG. 3, are designed with sufficiently fine gear pitch and shallow pressure angles to provide an involute contact ratio, defined as the number of teeth in contact from the root to the tip of the gear, of approximately 3. For example the normal diametrical gear pitch may be in the range of approximately 24 to 26, and the pressure angles in the range of approximately 9 to 11 degrees. When such gear tooth geometry is combined with a high helix angle, such as approximately 35 to 37 degrees, a total contact ratio of approximately 5 may be yielded such that about five teeth are meshed at a given time providing greater load sharing and less noise transmission. Because of microscopic variations in tooth index and thickness, the five contacting teeth will strike in damped succession during engine speed fluctuations. Instead of a single, high amplitude strike between two contacting teeth, there will be five less forceful impacts over a longer time span, resulting in reduced noise transmission. Such a gear geometry is acceptable because the overall loads on the gears are negligible as the balance shaft weights 33 essentially free spin on the shafts 22,24. Also due to the low loads, no heat treatment of the gears is required after final machining of the teeth. Therefore distortion of the tall, narrow teeth is not a concern.

To further reduce gear rattle in the balancer 20, the crankshaft helical spur gear 34 and the second gear 38 of the second balance shaft 24 are preferably made from grey cast iron to take advantage of the damping capacity provided by microscopic graphite flakes giving a discontinuous medium for noise to travel through. Since the engine cylinder block 12 and balancer housing 27 are preferably made from aluminum for mass efficiency, the first gear 36 of the first balance shaft 22 is also preferably made from aluminum to provide partial thermal expansion compensation. If the balancer housing 27 and cylinder block 12 are made from cast iron, then the gears 36,38 of the balancer 20 should also be made from grey cast iron for consistent thermal expansion.

Alternatively the crankshaft means 34 to drive the balancer 20 may be a chain drive but a gear drive is preferable because of packaging constraints and chain durability concerns under high speeds. If a chain drive is employed, the mating balancer gears 36,38 may still use the beneficial gear geometry as discussed above and to further reduce gear rattle, one of the balancer gears may be aluminum and the other grey cast iron.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An internal combustion engine, comprising:
   a crankshaft having a helical spur gear mounted for rotation therewith, a balancer including a balancer housing, first and second balance shafts rotatably carried in said balancer housing about laterally spaced parallel axes, a first gear mounted on said first balance shaft driven by said helical spur gear at a speed determined by said crankshaft, a second gear mounted on said second balance shaft for meshing engagement with said first gear for rotation in a direction opposite to said first gear, said helical spur gear and said first and second gears having teeth yielding an involute contact ratio of approximately 3 and a total contact ratio of approximately 5 to thereby reduce gear rattle.

2. An internal combustion engine, as defined in claim 1, wherein said helical spur gear and said first and second gears having a helix angle of approximately 35 to 37 degrees, a normal diametrical gear pitch of approximately 24 to 26, and pressure angles of approximately 9 to 11 degrees.

3. An internal combustion engine, as defined in claim 2, wherein said helical spur gear of said crankshaft and said second gear of said second balance shaft are composed of grey cast iron and said first gear of said first balance shaft is composed of aluminum.

4. An internal combustion engine, as defined in claim 1, wherein said helical spur gear of said crankshaft and said second gear of said second balance shaft are composed of grey cast iron and said first gear of said first balance shaft is composed of aluminum.

5. A balancer for an internal combustion engine, comprising:
   a balancer housing, first and second balance shafts rotatably carried in said balancer housing about laterally spaced parallel axes, a first gear mounted on said first balance shaft driven by a crankshaft means at a speed determined by said crankshaft, a second gear mounted on said second balance shaft for meshing engagement with said first gear for rotation in a direction opposite to said first gear, said first and second gears having teeth yielding an involute contact ratio of approximately 3 and a total contact ratio of approximately 5 to thereby reduce gear rattle.

6. A balancer, as defined in claim 5, wherein said crankshaft means is a helical spur gear mounted for rotation with a crankshaft and wherein said helical spur gear of said crankshaft and said second gear of said second balance shaft are composed of grey cast iron and said first gear of said first balance shaft is composed of aluminum.

7. A balancer, as defined in claim 6, wherein said helical spur gear and said first and second gears having a helix angle of approximately 35 to 37 degrees, a normal diametrical gear pitch of approximately 24 to 26, and pressure angles of approximately 9 to 11 degrees.

* * * * *